(12) United States Patent
Gibson et al.

(10) Patent No.: US 10,948,656 B2
(45) Date of Patent: Mar. 16, 2021

(54) FIBER-BASED MID-IR SIGNAL COMBINER AND METHOD OF MAKING SAME

(75) Inventors: Daniel J. Gibson, Cheverly, MD (US); Leslie Brandon Shaw, Woodbridge, VA (US); Jasbinder S. Sanghera, Ashburn, VA (US); Frederic H. Kung, Alexandria, VA (US); Ishwar D. Aggarwal, Fairfax Station, VA (US)

(73) Assignee: The Government of the United States of America, as Represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 12/645,315

(22) Filed: Dec. 22, 2009

(65) Prior Publication Data

US 2011/0002585 A1     Jan. 6, 2011

Related U.S. Application Data

(60) Provisional application No. 61/139,674, filed on Dec. 22, 2008.

(51) Int. Cl.
*G02B 6/10* (2006.01)
*G02B 6/28* (2006.01)
*H01S 3/067* (2006.01)

(52) U.S. Cl.
CPC ............ *G02B 6/2856* (2013.01); *G02B 6/102* (2013.01); *H01S 3/06708* (2013.01); *H01S 3/06737* (2013.01)

(58) Field of Classification Search
CPC .............................. G02B 6/2856; G02B 6/102
See application file for complete search history.

(56) References Cited

U.S. PATENT DOCUMENTS

| | | | | |
|---|---|---|---|---|
| 3,830,667 | A * | 8/1974 | Carpenter | 156/155 |
| 4,932,747 | A * | 6/1990 | Russell et al. | 385/115 |
| 5,339,374 | A * | 8/1994 | Murphy et al. | 385/43 |
| 5,594,822 | A * | 1/1997 | Berkey | G02B 6/2835 385/43 |
| 5,754,715 | A * | 5/1998 | Melling | 385/12 |
| 5,864,644 | A | 1/1999 | DiGiovanni et al. | |
| 6,434,302 | B1 * | 8/2002 | Fidric et al. | 385/43 |
| 6,823,117 | B2 | 11/2004 | Vakili et al. | |
| 7,209,615 | B2 | 4/2007 | Fishteyn | |
| 7,272,956 | B1 | 9/2007 | Anikitchev et al. | |
| 7,599,405 | B2 | 10/2009 | Rogers et al. | |
| 2004/0165620 | A1 | 8/2004 | Rogers et al. | |
| 2004/0165827 | A1 * | 8/2004 | Bruesselbach | G02B 6/04 385/46 |
| 2006/0045444 | A1 * | 3/2006 | Miller et al. | 385/115 |
| 2007/0237453 | A1 * | 10/2007 | Nielsen et al. | 385/28 |

* cited by examiner

*Primary Examiner* — Chris H Chu
(74) *Attorney, Agent, or Firm* — U.S. Naval Research Laboratory

(57) ABSTRACT

The present invention is generally directed to a device comprising multiple specialty glass optical fibers that combines several different mid-infrared optical signals from multiple optical fibers into one signal in a single optical fiber. In addition, the present invention provides for a method of making the device.

6 Claims, 3 Drawing Sheets

FIBER-BASED MID-IR SIGNAL COMBINER AND METHOD OF MAKING SAME

PRIORITY CLAIM

The present application claims priority from U.S. Provisional Application No. 61/139,674 filed on Dec. 22, 2008 by Daniel J. Gibson et al., entitled "FIBER BASED MID-IR SIGNAL COMBINER AND METHOD OF MAKING SAME," the entire contents of which are incorporated herein by reference.

BACKGROUND OF THE INVENTION

Field of the Invention

The present invention relates generally to optical fibers and, more specifically, to combining signals from multiple optical fibers.

Description of the Prior Art

Oftentimes an optical process requires a mid-IR signal with characteristic output that is not attainable from a single conventional optical source. Such requirements may be, for example, broad-spectrum or multi-line emission or higher optical power than readily available. One example would be a fiber laser where conventional diode pump sources cannot produce adequate optical power to incite lasing in the active fiber. Under such circumstances, the most obvious solution is to combine multiple component sources in such a way that their signals can be combined, such that the resultant signal is of a sufficient quality (e.g. a threshold level of optical power or spectral composition). Logistically this is a difficult endeavor: free-space combining is cumbersome and waveguide-based devices operating in the mid-IR are non-existent. Devices of similar utility have been made and are based around couplers comprised of silica glass, but these devices are not compatible with mid-infrared wavelengths (2-5 µm).

BRIEF SUMMARY OF THE INVENTION

The aforementioned problems are overcome in the present invention which provides a device comprising multiple specialty glass optical fibers that combines several different mid-infrared optical signals from multiple optical fibers into one signal in a single optical fiber. In addition, the present invention provides for a method of making the device.

The fiber-based mid-IR signal combiner of the present invention can be used to enable a wide variety of new and compact mid-IR sources including multi-wavelength sources and high-power optical pump sources for fiber lasers. Such sources can be used as chemical sensors for hazardous agent detection and process control and next generation high power infrared missile warning systems. The present invention can replace cumbersome bulk optics currently used in combining multiple mid-IR signals, thereby reducing system complexity, weight and cost. The fiber-based signal combiner also has the inherent advantage of simplified coupling to other fiber-based devices including fiber lasers and amplifiers and laser sources with attached fiber pigtails.

It is understood that this disclosure pertains primarily to a signal combiner made from specialty glasses such as chalcogenide glasses including sulfides, selenides, tellurides and their mixtures, as well as chalcohalide glasses and other oxide glasses including specialty silicates, germinates, phosphates, borates, gallates, and their mixtures. It is also possible to apply this methodology to halide glasses such as fluorides. It is understood that this device may be used for combining signals of mid-IR, near-IR and far-IR wavelengths as well as visible wavelengths depending on the glass comprising it.

Alternate methods for combining mid-IR signals from multiple fibers are limited to free-space signal combining using bulk optical components (lenses, mirrors, etc.). There is no current waveguide-based method or device for combining mid-IR signals from multiple fibers into a single output fiber.

These and other features and advantages of the invention, as well as the invention itself, will become better understood by reference to the following detailed description, appended claims, and accompanying drawings.

DETAILED DESCRIPTION OF THE INVENTION

The present invention is a fiber-based mid-IR signal combining device, methods for fabricating the device and laser system utilizing the device. The device is comprised of several (3-100 or more) mid-IR transmitting non-silica-based glass optical fibers of conventional core-clad structure (input fibers) which, in the central section of the device, are tapered to a smaller diameter, close-packed, fused together and jacketed by a second cladding, such that the aggregate device transitions in form and function to become a second fiber (the output fiber) wherein the cores of the input fibers are now very small and no longer support any fiber modes, and the aggregate cladding of the input fibers now constitutes the "core" of the output fiber, the cladding of which is comprised of the device's jacketing. The core diameter and numerical aperture of the input fibers and the output fibers can be designed for coupling to specific fiber-based sources and devices. It is also possible to induce twist during the fusing and tapering stage to encourage mode mixing between fiber cores. In fabricating the device, it is also possible to use fibers that have been tapered. The fibers could be tapered by heat and tension, either during or after the fiber drawing process, or they may be tapered by any combination of chemical, thermal or mechanical etching, which may or may not expose the fiber core at some point along the tapered length.

The present invention also includes a system comprised of a plurality of mid-IR light sources coupled to the fiber-based mid-IR signal combiner, the output of which is coupled to an output fiber. The mid-IR light sources could be incoherent light sources or lasers and may be of any of the following types: diode, gas, quantum-cascade, inter-band, intra-band, fiber, ceramic, crystal, super continuum and others. The coupled light sources may or may not have the same wavelength or power. It is also recognized that all or part of the output fiber exiting the coupler may be an active fiber, such as a rare-earth doped fiber or non-linear fiber, and the system may function as a fiber laser system. The system may also incorporate fiber Bragg gratings in portions of either the input or output fibers.

Example 1

Figure 1:
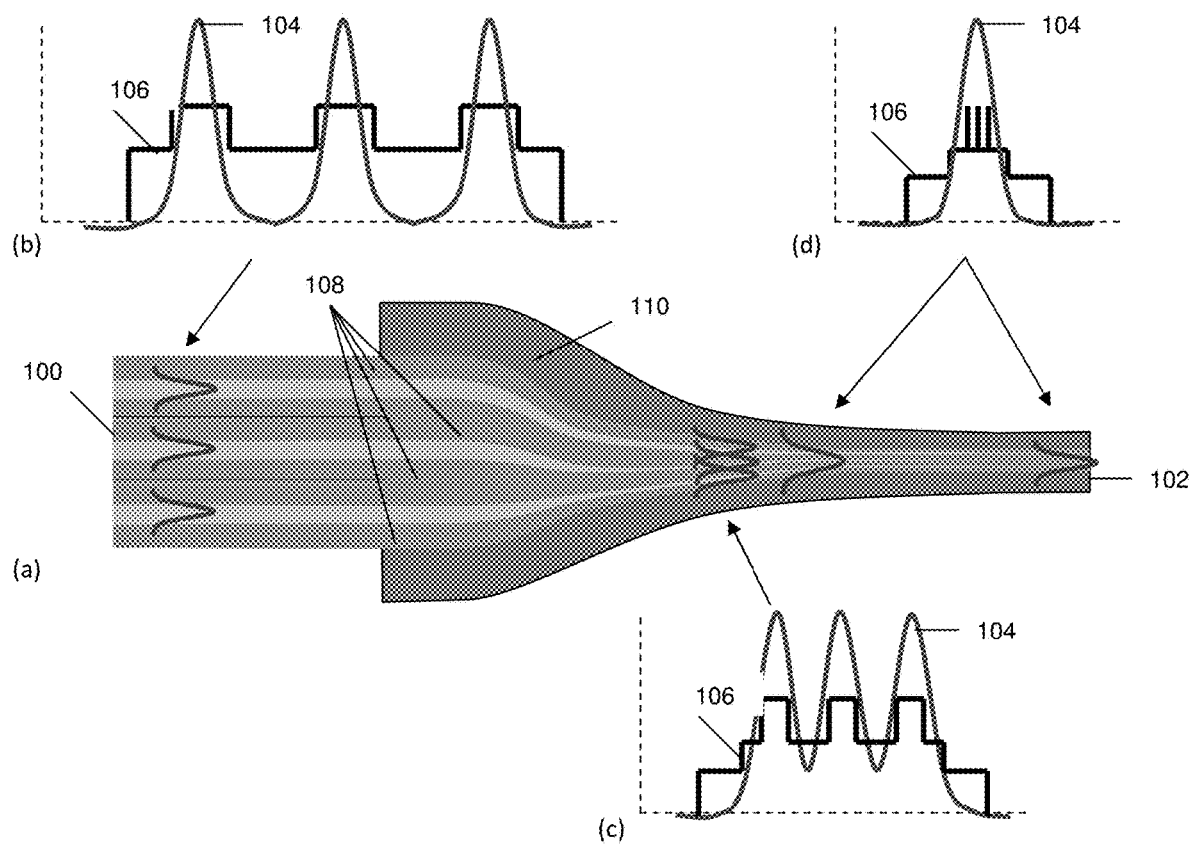
FIG. 1(a) is a cross-sectional schematic of a fiber-based mid-IR signal combiner with 3 input fibers 100 and 1 output fiber 102.
FIG. 1(b) shows the input fibers' core modes 104 overlaid on local refractive index profile 106.
FIG. 1(c) shows that in the tapered region, these modes overlap as light leaks into the cladding in the tapered region.
FIG. 1(d) shows that the signals couple to the fundamental mode of the output fiber as the fiber claddings 108 form a core inside the lower index jacket 110. The combined signal propagates as the fundamental mode of the output fiber.

One simplified embodiment of the device is shown schematically in FIG. 1 and utilizes 3 input fibers 100 and a single output fiber 102. A more practical embodiment would utilize 6 to 100 or more input fibers 100 and a single output fiber 102. Optical signals entering the device are confined primarily to the cores of the individual input fibers 100 as dictated by the refractive index profile 106 and mode structure 104 of the input fibers 100. As shown in FIG. 1(c), in the tapered region of the device, the cores of the input fibers become small enough that their mode fields overlap and the optical signals are dejected into the fiber cladding. As the taper progresses, the input fiber cores can no longer support any core modes and the optical signal is entirely dejected to the cladding where it is confined by the secondary cladding introduced by the jacket tube with a lower refractive index 106. In this region, the signals are combined and supported by the fundamental mode of the output fiber 102 (see FIG. 1(d)).

Figure 2:
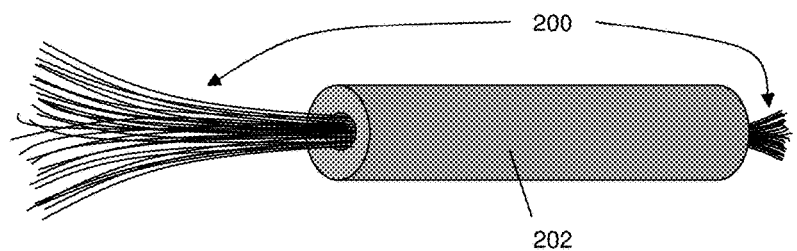
FIG. 2 shows a preform assembly used to make mid-IR signal combiner comprising 3 to 100 or more specialty glass fibers 200 and a specialty glass tube 202.

The device may be fabricated as follows: (1) Gather a multitude of standard core/clad specialty glass fibers with no protective outer coating. (2) Partially insert the gathered bundle of fibers 200 into a specialty glass tube 202 with a sufficient inner diameter and a refractive index lower than that of the fiber cladding (see index profile 106 of FIG. 1(c)) as shown in the schematic of FIG. 2. The tube 202 in this example was fabricated by extrusion, but may also be cast or rotational cast. (3) Heat and fuse the aggregated fibers 200 and the glass tube 202 to one another at a temperature corresponding to a viscosity of $10^{10}$ to $10^8$ Poise (actual temperature is dependent upon glass composition and viscosity) to form a preform (4) Heat the preform to a temperature corresponding to a viscosity of $10^8$ to $10^4$ Poise and stretch a portion of the preform down to a fiber of appropriate diameter.

Figure 3:
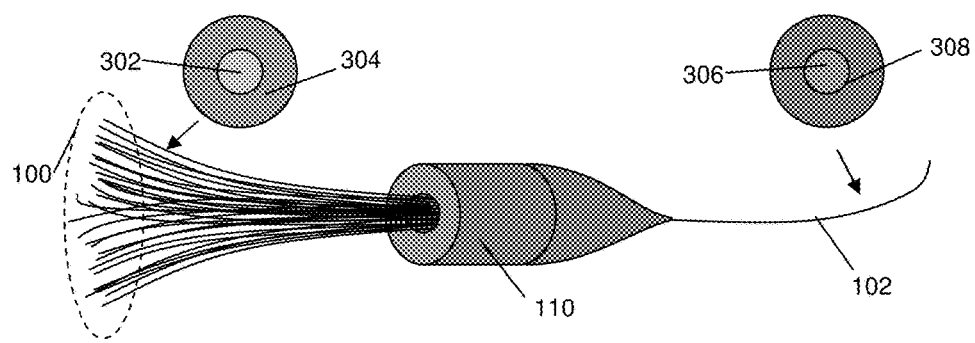
FIG. 3 shows a fiber-based mid-IR signal combiner comprising 3 to 100 or more specialty glass input fibers 100 each with a core 302 and cladding 304 a specialty glass jacket tube 110 and a single output fiber 102 with a core 306 and a cladding 308.

As shown in FIG. 3, the fibers 200 of the preform form the input fibers 100 of the signal combiner and have a core 302 and cladding 304. The output fiber 102 of the signal combiner comprises a core formed from the 306 aggregate of the fibers in the preform and a cladding 308 formed from the jacket tube 110.

Note that the secondary cladding could also be formed by a bundle of glass tubes which when drawn down forms a microstructured cladding as seen in photonic crystal type fiber. Here too, the effective index of this cladding must be lower than then cladding of the fibers forming the coupler.

Example 2

Figure 4:
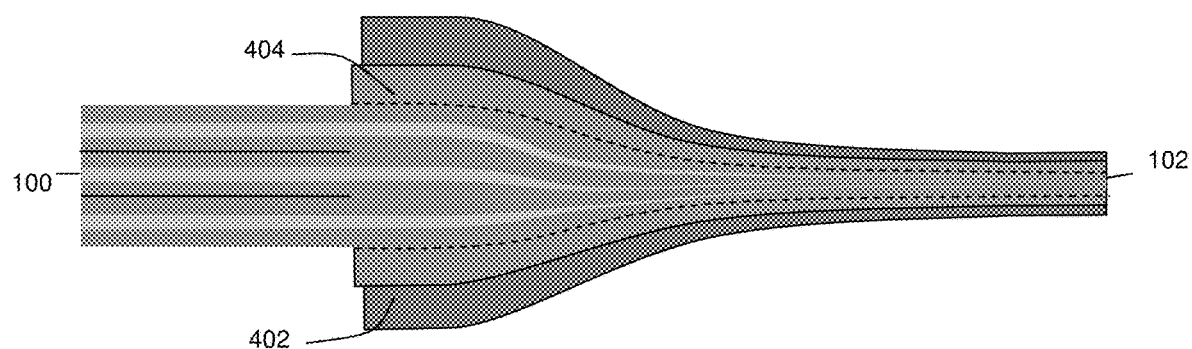
FIG. 4 is a cross-sectional schematic of fiber-based mid-IR signal combiner with six input fibers 100, one output fiber 102, a secondary cladding 402 and an overcladding 404 to enlarge output fiber core.
Figure 5:
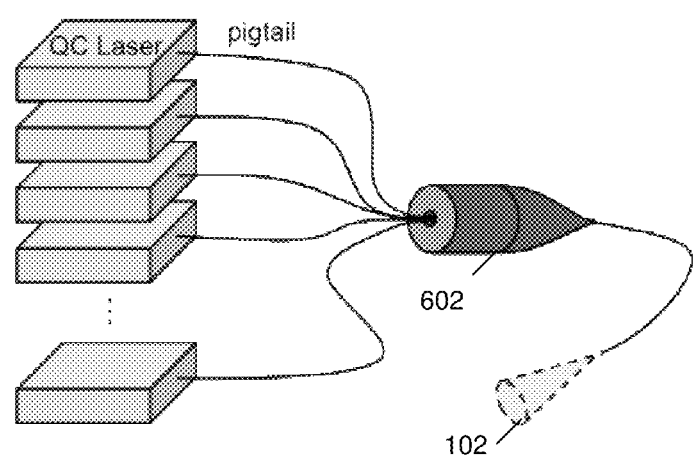
FIG. 5 shows a high-power laser system comprising 6 quantum-cascade (QC) lasers, a fiber-based mid-IR signal combiner 602 and a multimode output fiber 102.

In another embodiment, depicted in FIG. 4, the input fibers 100 are inserted, en masse, into an overclad tube 404, whose refractive index matches (or is slightly lower) that of the input fiber cladding, before being inserted into the secondary cladding 402 tube. In this case, both tubes, overclad 404 and secondary cladding 402 are fabricated by extrusion and are made from similar glass compositions, but they may also be cast or rotational cast. This is done when the number of input fibers 100 is low, e.g. 6, and both the input 100 and output fibers 102 are to be of similar core size. This overcladding 404 permits the input fiber cores to be drawn to a small enough size that core modes no longer are possible, yet the fiber cladding, combined with the overcladding, remains large enough to function as a large core in the output fiber 102. Note that it is possible to incorporate both the overcladding 404 and secondary cladding 402 as a single tube with an appropriate refractive index profile, so that only a single insertion step is needed. Also the overcladding is a solid glass, but could also be a bundle of glass tubes/rods which when drawn down form a microstructured overcladding with appropriate effective index profile. Alternatively, the individual fibers can be overclad individually prior to insertion into the jacket tube for similar reasons.

Example 3

One specific example of this invention is a fiber-based mid-IR signal combiner comprised of 6 arsenic sulfide input fibers each having a 100-μm core diameter, a 250 μm outer diameter and a numerical aperture of 0.2. The output fiber in this example has a 200-μm core diameter and a numerical aperture of 0.5. This device is designed to accept emission from six 1-W mid-IR lasers, each coupled to one of the six input fibers, and deliver a total combined 5.5 W of mid-IR laser energy to an active mid-IR fiber, as part of a cladding pumped fiber laser system.

Example 4

A system, comprised of six quantum-cascade (QC) lasers, a mid-IR fiber-based signal combiner 602 (as described in Example 3 above) and a multimode output fiber 102 is shown in FIG. 6. Each of the QC lasers is coupled directly to an input fiber of the signal combiner 602. The output fiber 102 of the signal combiner 602 is coupled to a multimode fiber. In this embodiment, the optical energy of the 6 QC lasers is combined in the signal combiner and exits the system through the multimode fiber.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A mid-infrared (mid-IR) signal transmitting device, comprising:

a plurality of mid-IR transmitting optical input fibers each constructed to transmit a mode of a corresponding optical signal, wherein each of the plurality of optical input fibers includes: an input core and an input cladding having a first refractive index;

a mid-IR transmitting glass tube having a second refractive index lower than the first refractive index of the input claddings of the plurality of optical input fibers; and a jacketing disposed around a periphery of the mid-1R transmitting glass tube, wherein in a first region of the device the plurality of optical input fibers are not disposed within the glass tube, wherein in a second region of the device, disposed downstream of the first region in a direction of optical signal propagation, the plurality of optical input fibers are disposed within the glass tube, and for each of the optical input fibers a diameter of the input core is sufficient to confine the mode of the optical signal to the input core, and wherein in a third region of the device, disposed downstream of the second region in the direction of optical signal propagation, the plurality of optical input fibers, the glass tube, and the jacketing are tapered such that their respective outer diameters decrease in magnitude in the direction of signal propagation, and in a portion of the third region, outer diameters of the input cores of the plurality of optical input fibers are insufficient to confine the modes of the respective optical signals to the input cores and the optical signals are dejected from the input cores to propagate through an output core formed from the input claddings of the plurality of optical input fibers, and wherein in a fourth region of the device, disposed adjacent to and downstream of the third region in the direction of signal propagation and extending to an end of the mid-IR signal transmitting device, the outer diameter of the jacketing is substantially the same and less than the outer diameter of the jacketing in the third region.

2. The device of claim 1, wherein the plurality of input fibers are chalcogenide glasses including sulfides, selenides, tellurides, and any mixture thereof; chalcohalide glasses; other oxide glasses including specialty silicates, germinates, phosphates, borates, gallates, and any mixture thereof; halide glasses including fluorides; or any mixture thereof.

3. The device of claim 1, wherein the plurality of optical input fibers are twisted.

4. A laser system comprising the device of claim 1.

5. The device of claim 1, wherein, in the third region, for each of the plurality of optical input fibers the diameter of the input core is insufficient to confine the mode of the optical signal to the input core and the optical signal is entirely dejected from the input core.

6. A mid-infrared (mid-IR) signal transmitting device, comprising:

a plurality of mid-IR transmitting optical input fibers each constructed to transmit a mode of a corresponding optical signal, wherein each of the plurality of optical input fibers includes: an input core and an input cladding having a first refractive index;

a mid-IR transmitting glass tube having a second refractive index lower than the first refractive index of the input claddings of the plurality of optical input fibers; and a jacketing disposed around a periphery of the mid-IR transmitting glass tube, wherein the mid-IR signal transmitting device includes:

a tapered region in which the plurality of optical input fibers, the glass tube, and the jacketing are tapered such that their respective outer diameters decrease in magnitude in a direction of signal propagation, wherein, in a portion of the tapered region, outer diameters of the inputs cores of the plurality of optical input fibers are insufficient to confine the modes of the respective optical signals to the input cores and the optical signals are dejected from the input cores to propagate through an output core formed from the input claddings of the plurality of optical input fibers, and an output fiber region disposed adjacent to and downstream of the tapered region in the direction of signal propagation and extending to an end of the mid-IR signal transmitting device, wherein in the output fiber region the outer diameter of the jacketing is substantially the same and less than the outer diameter of the jacketing in the tapered region.

* * * * *